Figure 1:
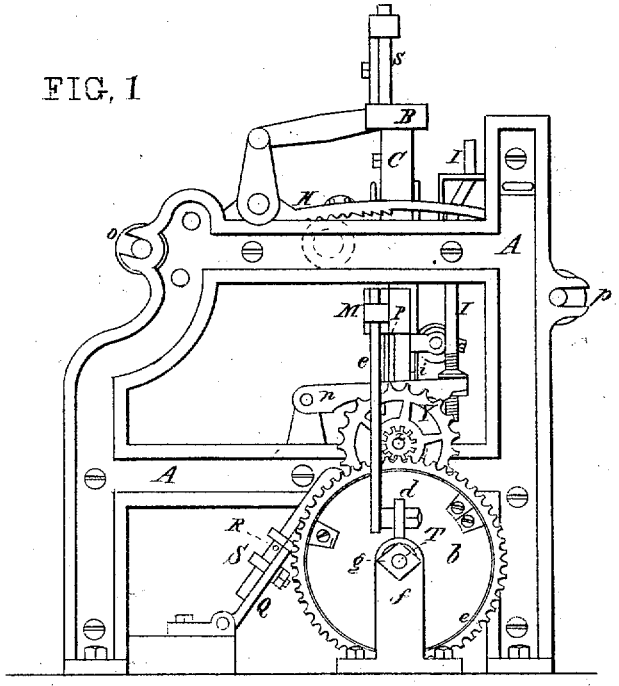

F. W. NEWTON.

Lappet Looms.

No. 5,365. Reissued April 22, 1873.

Witnesses

A. M. Malcomson

James H. Hunter

Inventor

F. W. Newton

6 Sheets--Sheet 2.

F. W. NEWTON.
Lappet Looms.

No. 5,365. Reissued April 22, 1873.

Witnesses
A. B. Macconsan
James H. Hunter

Inventor
F. W. Newton

6 Sheets--Sheet 3.

F. W. NEWTON.

Lappet Looms.

No. 5,365. Reissued April 22, 1873.

Witnesses
A. B. Macconnson
James H. Hunter

Inventor
F. W. Newton

F. W. NEWTON.
Lappet Looms.
No. 5,365.
Reissued April 22, 1873.
FIG. 6
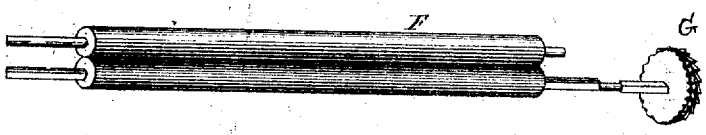
FIG. 11
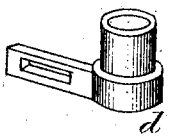
FIG. 7
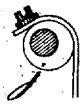
FIG. 14
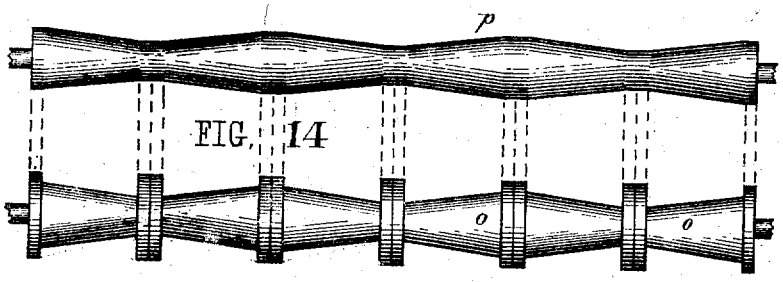
FIG. 14
FIG. 16
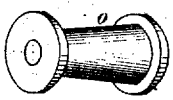
FIG. 9
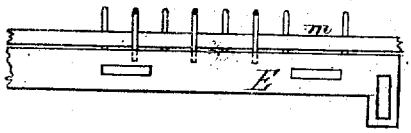
FIG. 8
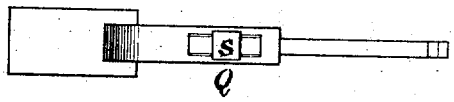
FIG. 12
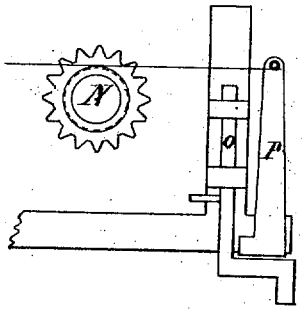
FIG. 10
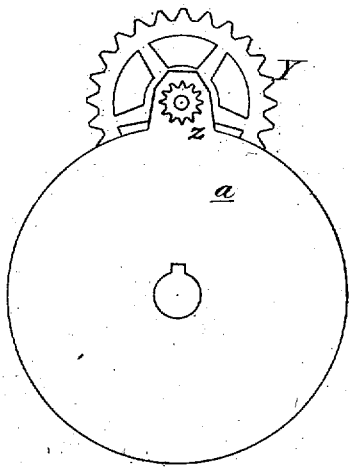
FIG. 13
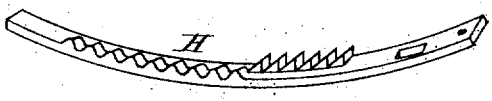
Witnesses
A. B. Macauley
James H. Hunter
Inventor
F. W. Newton

F. W. NEWTON.
Lappet Looms.
No. 5,365. Reissued April 22, 1873.
FIG. 18
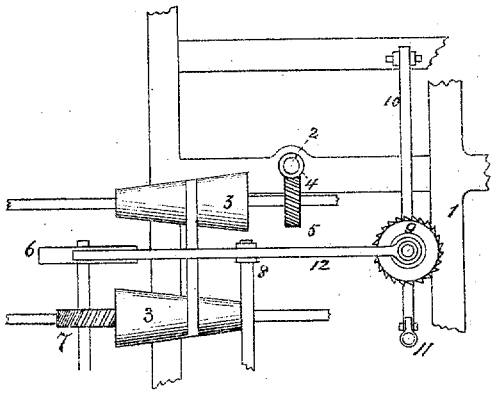
FIG. 19
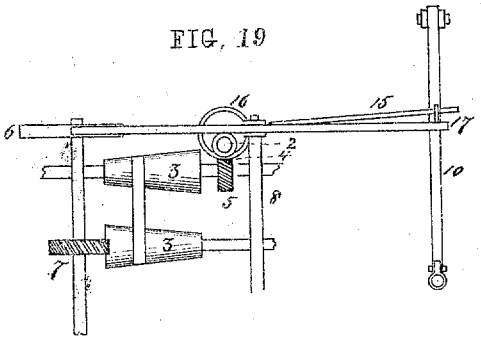
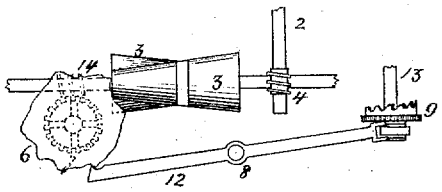
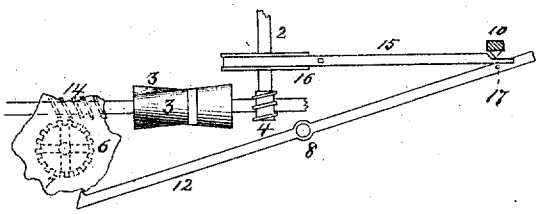
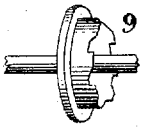
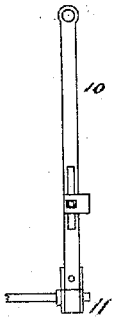
Fig. 17
Witnesses
A. B. Malcomson Jr.
James E. Hunter
Inventor
F. W. Newton

F. W. NEWTON.
Lappet Looms.
No. 5,365. Reissued April 22, 1873.
FIG. 20
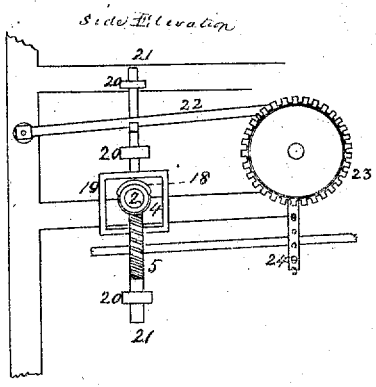
FIG. 21
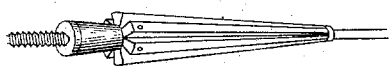
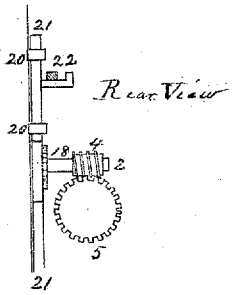
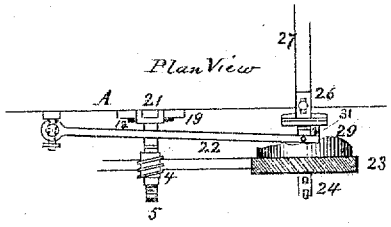
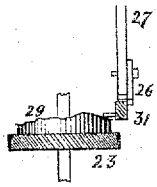
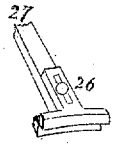
Witnesses
A. B. Macconson
James H. Hunter
Inventor
F. W. Newton

UNITED STATES PATENT OFFICE.

FREDERICK W. NEWTON, OF SOUTH ORANGE, NEW JERSEY, ASSIGNOR, BY MESNE ASSIGNMENTS, TO WM. L. POMEROY AND JOHN F. PLUMMER.

IMPROVEMENT IN LAPPET-LOOMS.

Specification forming part of Letters Patent No. 84,753, dated December 8, 1868; reissue No. 5,365, dated April 22, 1873; application filed August 29, 1871.

*To all whom it may concern:*

Be it known that I, FREDERICK W. NEWTON, of South Orange, county of Essex and State of New Jersey, have invented certain new and useful Improvements in the Fancy Power-Loom, commonly known as the "Lappet-Loom;" and that this specification contains a full and accurate description of my invention, reference being had to the accompanying drawing which forms a part thereof.

The nature of this invention is the adaptation of the lappet-loom to producing, not only a better class of work than it has heretofore done, but also to the weaving of large and flowing figures, such as are suitable for the borders of gored skirts or dresses, either woven on the body of the garment or separately and attached afterward.

The figures produced by the lappet-loom have heretofore been very limited in their longitudinal section from the fact that in all lappet-looms run by power the stitch-motion has been an adjunct of the pattern mechanism, both the stitch and the pattern being generally made by the lappet-wheel, the scope of which is necessarily limited.

In adapting the loom to a class of work requiring a large circular or irregular figure, I have found it necessary to separate the stitching mechanism from the pattern mechanism in order that the pattern mechanism might have scope sufficient for the pattern desired. For this purpose I have found it essential that the two mechanisms be actuated by different powers, or by connecting them with the same power, but through intermediate gearing or other suitable attachment, so as to give each mechanism a motion distinct from the other, so that the speed of each may be adjusted independently of the other. This invention consists, furthermore, in means for giving the whip-yarns to the needles in definite adjustable quantities without tension, besides other arrangements and combinations of parts, which will be found hereinafter fully described.

Figure 2:
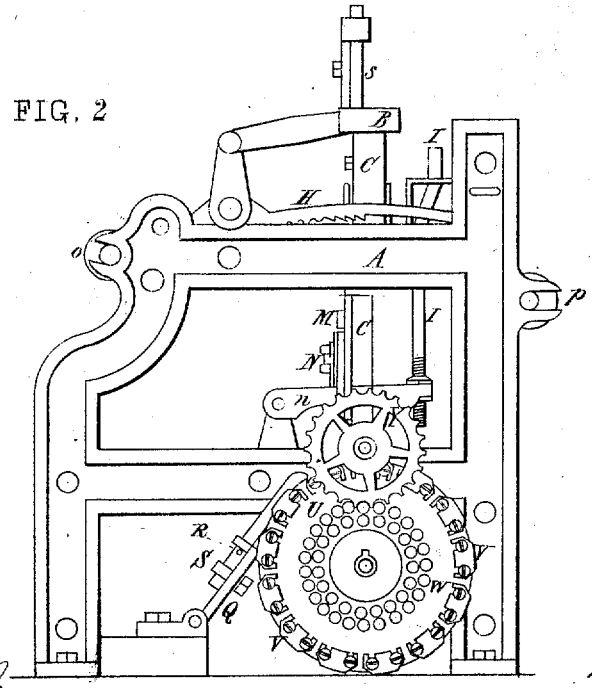
Figure 3:
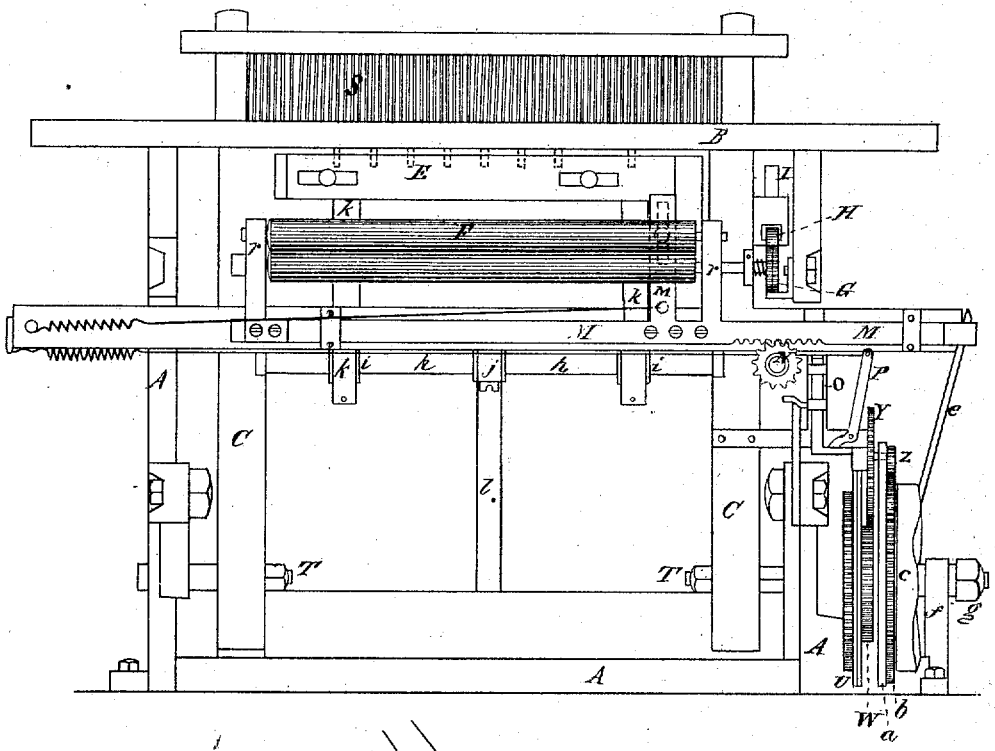
Figure 4:
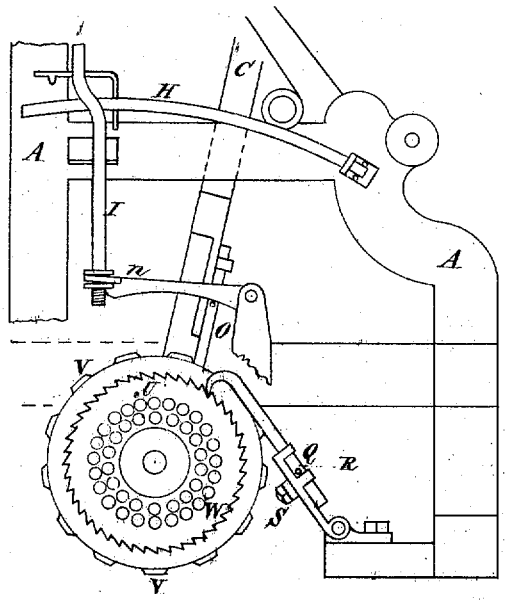
Figure 5:
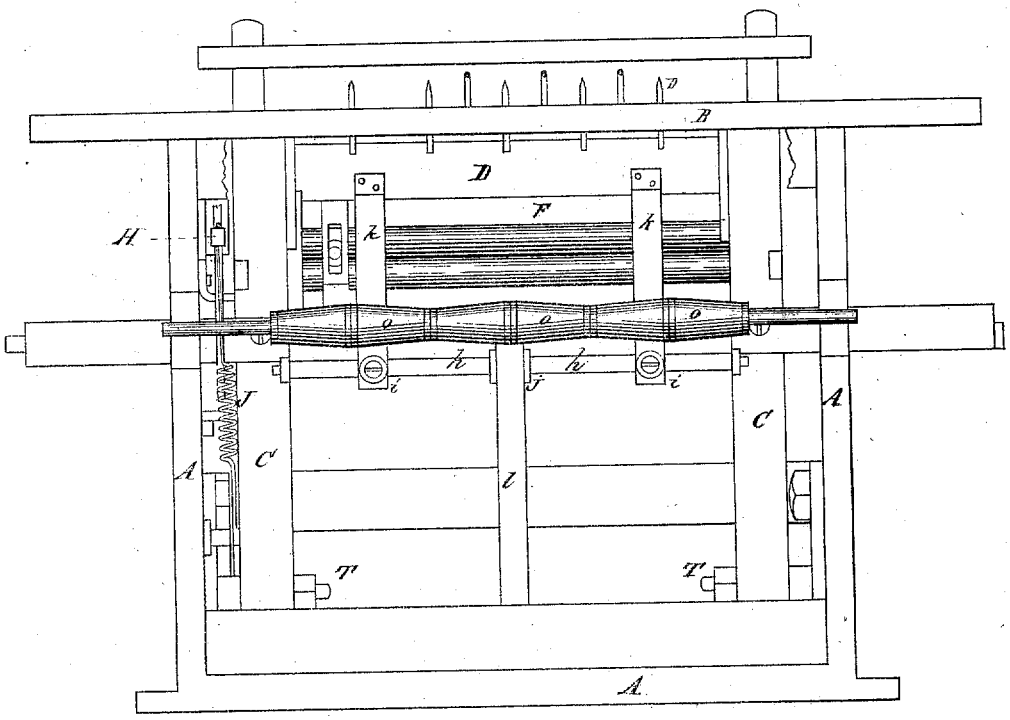

In the accompanying drawing, Figure 1 gives an end elevation of a loom, showing the position and connections of one arrangement of the pattern mechanism. Fig. 2 is a sectional view, the pattern-wheel *b* and stand *a* being removed, showing the position and connection of one arrangement of the stitching mechanism. Fig. 3 is a rear elevation of the lay, showing the position of the needle-bar and let-off rolls, and their connection with the pattern and stitch mechanism. Fig. 4 is an obverse elevation of the ratchet-wheel *u*, showing its position and connection with the pawl Q, the lever *n*, wedge-bar I, and pins W. Fig. 5 is a front elevation of the lay, showing the position of the pin-bar and lifting apparatus, together with the cloth-beam. Fig. 6 shows the friction-rollers and combined spur and ratchet G. Fig. 7 is a section of the lifting-rod *h* with the lifting cam-roller *j*. Fig. 8 shows the bottom of the pawl Q, with the position of the slot in which the bearing S is adjusted. Fig. 9 shows the position of the guide-strip *m* and its connection with the needle-bar E and the needles and pins. Fig. 10 shows the stand *a* with its connections with *y* and *z*. Fig. 11 shows the friction-sleeve *d*. Fig. 12 shows the operation of the friction-gear N, the stitch-lever P, and the stitch-bar O. Fig. 13 shows the under side of the compound rack H. Fig. 14 shows the cloth-beam *p* in juxtaposition with the conical spools *o*. Fig. 16 shows one of the conical spools detached. Fig. 17 shows the lever 10 detached. Fig. 18 shows a front elevation and plan view of an arrangement of the stitching and pattern mechanisms, in which the pattern mechanism is connected with the stitch-wheel by a lever; also showing the stitch-wheel 9 detached, and having the stitch-teeth exaggerated. Fig. 19 shows a side elevation and plan view of another arrangement of the pattern mechanism and stitching mechanism. Fig. 20 shows still another arrangement of the stitching and pattern mechanisms, giving a side view, a plan view, a rear view with cam 18 detached, and the stitching mechanism with its connections. Fig. 21 shows a device for expanding the conical spools and cloth-beam.

A is the frame of the loom. B is the lay; C C, the lay-swords; D, the pin-bar and pins; E, the needle-bar and needles; F, the let-off rollers; G, the compound ratchet and pinion wheel, to regulate the motion of the let-off rollers; H, the compound rack; I I, the double-wedge bar, to give motion to the compound rack H; J, spring to hold the rack against the compound pinion G; M, the traverse-bar, with upright stand; N, friction-gear, to give the stitch-motion to the traverse-bar M; O, the stitch-bar; P, the stitch-lever; Q, sliding pawl; R, pin that stops the slide in the pawl; S, movable bearing for the slide in the pawl; T T, the bearings of the swords of the lay; U, ratchet-wheel for making the stitch; V, stitch-swells or teeth; W, pins for giving motion to the spur-wheel Y; Y, spur-wheel; Z, pinion-wheel; *a*, stand for supporting Y and Z; *b*, pattern-wheel; *c*, pattern-rim; *d*, friction-sleeve and stand for lever *e*; *e*, traverse or pattern lever; *f*, bearing; *g*, friction-nut; *h*, lifting-rod; *i i*, lifting-rollers; *j*, cam-roller; *k k*, upright bars for lifting the needle-bars and pin-bar; *l*, lifting-strap; *m*, guide for pins; *n*, horizontal lever for moving the wedge-bar; *o*, conical spools for the warp; *p*, cloth-beam in conical sections; *r r*, arms attached to the traverse-bar M for the purpose of giving lateral motion to the friction and let-off rollers F; *s*, the reed.

The peculiar motion required for the formation of the embroidered figure in all embroidery or lappet looms is obtained from the operation of the pattern mechanism, which, in the arrangement shown in the drawing, Figs. 1 to 16, is placed upon the stud which forms the axis of the lay-sword, although I do not wish to be understood as being confined to placing the combined stitching and pattern mechanisms, operating as described, upon this part of the loom; but I have adopted this plan, which is entirely novel, because I thereby obtain, in the first place, a firm bearing upon the floor, whereby I avoid adding weight to the lay, which, of course, increases the difficulty of running the loom.

In ordinary lappet-looms the stitching and pattern mechanisms are placed at or near the top of the lay, thereby greatly increasing its weight. Besides, it is a great disadvantage to have the machinery, the operation of which should be accurate and delicate, subjected to the jar and vibration of the lay. By putting my mechanism upon the floor, and operating it upon the same axis as the lay, I am enabled to make my machinery solid and heavy, and to give it careful and accurate adjustment without perceptibly increasing the labor of the loom; besides, making the most convenient point at which I can connect the moving parts, which are attached to the lay, with those which are on the frame of the loom or on the floor. It is true that in lappet-looms run by hand, where the lay was hung from overhead, the lappet mechanism was hung, in one case, upon the center of the axis of the lay; but the object there attained was to balance the weight only, but not, as I am now doing on a power-loom, to obtain a solid bearing, and to make it the point of connection between the movable parts on the frame and movable parts on the lay.

The form of carrying out my invention that I have shown in the drawing hereto annexed, Figs. 1 to 16, consists of two wheels, U and *b*, placed side by side on the same axis—which is also the axis of the lay—having intermediate gearing, and moved by the oscillation of the lay itself. As the lay rocks back and forth these wheels and stand rock with it, and the required motion is given by the action of the sliding pawl Q. This pawl is fastened to the floor or frame of the loom, and is adjusted to take as many teeth in the ratchet-wheel U as may be wanted. If but one tooth is required the slide-catch is adjusted by the pin R and the movable bearing S, so that the catch will slide out for the whole distance of the stroke of the lay, except one tooth, allowing the ratchet-wheel to go with the lay until the slide is stopped by the pin, which holds the ratchet during the remainder of the stroke. As the lay rocks back the slide slips back by its own weight; or, if necessary, a spring may be attached to insure its coming back. If it is desirable to take two or more teeth the slide is adjusted accordingly. Upon the ratchet-wheel U is a raised rim, upon which are fastened the stitch swells or teeth V, independent of each other, and which may be removed and adjusted at pleasure. These swells must correspond with the number of the ratchet-teeth in the wheel U in the proportion of one to two, one to four, &c. These swells are arranged with slots and fastened with screws, so as to be adjustable as to height, thereby enabling me to make stitches of unequal lengths. The swells may be of varied lengths also, thereby permitting the use of a greater or less number, and covering any desirable number of teeth in the ratchet. The swells may also be arranged on a chain instead of on the rim of a wheel, thereby giving greater scope to the principle of varying the pattern by using stitches of different lengths. I consider these independent and removable stitch-teeth as valuable, because some of the finest effects of embroidery are obtained by having stitches of different lengths, and this plan gives new scope and facility to this work. Upon the side of the wheel U is placed a concentric row of pins W, which give motion to the spur-wheel Y. The stud of this wheel passes through the stand *a*, and is there made fast to the pinion Z, which in turn moves the pattern-wheel *b*. The spur-wheel Y may be changed for a larger or smaller one whenever it is necessary to alter the speed of *b*, in which case larger or smaller circles of pins must be arranged accordingly. By the use of the pins W, I can not only vary the speed of the pattern-wheel, but I can give it an irregular motion, or keep it entirely still by removing a part or all of the pins from U. Whenever the figure is formed, partly by the adjustment of the swells to different heights, it will obviously be necessary that one revolution of the pattern-wheel *b* should be equal to some number of complete revolutions of the stitch-wheel U. The stand *a*, which is a part of a disk, is made fast to the shaft T by a key or steady pin, but so as to slide on or off; and this stand by its frictional contact with the wheel U, holds it from slipping when not positively moved. This friction is regulated by the nut *g*, which presses against the sleeve *d*. This sleeve passes through the stand *f*, thus forming a bearing for the shaft T, and at the same time binding the whole together. The placing of the wheels U and *b* upon the same shaft, and gearing them together, or connecting them in any manner so that *b* takes its motion from U, is purely a matter of convenience and economy of room, as it is quite easy to arrange them so that they could be actuated by different powers. The sleeve *d* has a vertical stand or projection, in which is a slot to receive a stud, which constitutes the fulcrum of the lever *e*. The lever *e* passes at its upper end into a slot or bracket in the traverse-bar M, giving M its outward motion by the pressure of the pattern-rim *c*; *e* is held in position by the action of a spring attached to M, which draws the traverse-bar and everything attached to it toward the other end of the lay. I have made the pattern-rim *c* removable, and attached it to the pattern-wheel *b* by screws. Heretofore the stitching and pattern mechanism having been produced by the lappet-wheel, the pattern and the stitch motion have been cut upon the wheel itself. This has usually been done in wood, and, of course, has been too frail for permanently accurate work, and cutting the figures in metal has been entirely too costly; but I have adopted the device of cutting my pattern upon a strip of thin metal and attaching it to the wheel afterward. By this means I am enabled to produce accurate work, because I can first make the wheel true, so that I can fit any pattern to it, and then by a suitable arrangement of dies and punches I can form the thin metal pattern rim into accurate shapes with great rapidity and accuracy, and the whole having a firm bearing on the floor, I am enabled to work with a great degree of accuracy.

As the pattern revolves its projections push out the lever *e*, and its depressions allow it to come back, thereby giving the needles the motion which makes the figure on the cloth. By raising or lowering the fulcrum of the lever *e*, a greater or less traverse is given to the needles. The stitch movement is caused by the stitch-bar O, the lower arm of which is lifted by the movement of the teeth or swells V. The upper side of this arm raises the heel of the stitch-lever P, and throws out its upright arm. Fig. 12 shows this connection and movement. To the lever P is attached a wire, either round or flat, which has a turn around the pulley N. When the lever P is at rest, the wire does not bind the pulley so tightly but that it will allow the pulley to slide in the bight of the wire without revolving; but as the lever P is drawn back it tightens its hold on the pulley so much as to cause it to revolve sufficiently to move the traverse-bar as much as is necessary to form the stitch without interfering with its motion in shaping the figure. This wire is attached at its other end to a spring, so adjusted as to be at rest when the stitch-bar is down. (See Fig. 3.) The bar O and the lever P may be varied in shape or position, as practice may show to be desirable.

The stitch itself is formed by the lateral movement given to the needles by the stitch-gear N. As the needles fall down below the warp the stitch movement throws the needles under one or more threads of the warp, so that when the needles rise again and the shuttle goes under the whip-yarn, it forms a stitch. The needles then drop, are thrown again the other way under one or more threads of the warp, and then up, as before.

By a suitable alteration in the apparatus for lifting the needles, a stitch-motion may be made at every stroke, or every two or more strokes of the lay, according to the adjustment of the swells and the pawl Q.

The combination of the stitching mechanism and the pattern mechanism with the other arrangements of the loom may be effected in another manner, as shown in Fig. 18, in which a side elevation and plan view are given, and the stitch-wheel 9 is shown detached with exaggerated stitch-teeth. In this figure No. 1 is the frame of the loom. 2 is the cam-shaft, on which is placed a worm, 4, which turns the worm-gear 5. This moves the cone-pulleys 3 3, which again transmit motion, by another worm, 14, to the worm-gear 7. This worm-wheel is fast to the shaft of the pattern-wheel 6, which thus obtains a very slow motion, which is communicated to the lever 12, moving on its fulcrum 8, and to the stitch-wheel 9 sliding or traversing this wheel on the stud 13. The stitch-teeth of the wheel 9 operate on the bit or projection of the stitch-lever 10, which lever is made fast at its upper end to the loom side. At the lower end it transmits its motion, through the universal joint 11, to the needle-bars, which are placed on the lay, as usual. Thus the stitch and pattern motions are both transmitted, through the stitch-wheel, to the lever 10. The wheel 9 (which operates on the principle of the lappet-wheel, and is a well-known device for forming the stitch, the only motion that has ever been given to it, however, being the motion on its own axis,) is revolved on its shaft by a pawl, (made as broad as the traverse of the wheel requires,) which gives the stitch-motion, while the pattern-cam 6 shapes the figure on the cloth.

Fig. 19 gives a side elevation and plan view of another plan of stitching. The pattern mechanism is the same as in Fig. 18; but in this arrangement I do not use the stitch-wheel at all, but instead of it I put an eccentric, 16, on the cam-shaft just behind the worm, and to the strap of this eccentric I attach a stitch-bar, 15, which is pushed by the eccentric between the bit of the lever 10 and an upright pin, 17, standing near the end of the lever 12, moving on its fulcrum 8. As the eccentric draws the bar 15 back, the bit of 10 slips from the broad to the narrow part of the lever 15, thus giving the stitch-lever the same motion that it has from the stitch-teeth in the stitch-wheel 9, or from the operation of the stitch-swells V in the stitch-wheel U, heretofore described. In this case I am confined to stitches of equal lengths.

The cone-pulleys regulate the speed of the pattern-cam 6, and thereby govern the length of the pattern on the cloth.

Fig. 17 shows a side view of the lever 10 with the universal joint detached.

Fig. 20 gives another arrangement of the stitching and pattern mechanisms, in which I dispense with the cone-pulleys. In this figure the side elevation gives the position of the pin-wheel, pattern-wheel, and worm-wheel, and illustrates the method of lifting the lever 22. The plan view shows how the lateral movement is given to the lever 22 by the pattern-rim 29. The rear view shows worm 4 and connections with section of lever 22, the cam 18, traverse-bar 27 with sliding projection 26, and section of lever-head 31 and connections are shown detached.

I place the worm 4 on the cam-shaft, as before, and thereby move the worm-wheel 5; but instead of cone-pulleys I use the pin-wheel 24 to regulate the motion of the pattern mechanism. In the periphery of this wheel I place a row of movable pins, which play into the slanting gear-teeth of the pattern-wheel 23. By this means I obtain the effect of an adjustable worm-gear, as I can, by removing pins, change and regulate the motion of the pattern-wheel 23 at pleasure.

The stitch is made by the cam 18, which moves in the square frame 19, thereby raising and lowering the lever 22. This lever is hung on a bearing made to allow the lever to be moved laterally and vertically. The movement of this lever is controlled by the upright bar 21 21, which is made square and slides in the bearings 20 20 20. The lever is held by a projection on the bar 21, which allows it to slide laterally as it is moved by the pattern-rim 29.

At the end of the lever is a projection, 31, and a pin similar in arrangement and operation to that in Fig. 19, except that instead of resting against an upright lever, 10, it presses against the end of the traverse-bar 27, which has a circular T-shaped end to accommodate the oscillation of the lay; for it will be borne in mind that in this case the pattern mechanism is not placed on the axis of the lay-sword, but on an independent stud. On the upper side of the traverse-bar 27 is placed a sliding projection, 26, which rests over the T-shaped end of 27. At half the revolution of the cam-shaft the lever is up and the bit 31 rests against 26. At the other half it is down and rests against 27, thereby giving a regular reciprocating stitch-motion to the traverse-bar.

In all these forms and ways of carrying out my invention, the back motion is given to the needles by a weight or spring.

In all the arrangements described above there are so many obvious ways of adjusting the length of the stitch that I will not refer to them.

For the sake of convenience the traverse-bar M, heretofore described, may be made shorter and connected with the lever *e* by the use of a chain, and by elevating and depressing this chain between roller-bearings a stitch-motion may be made.

Also, in connecting the wheels U and *b* a system of levers and ratchet-teeth, or an arrangement of belts and pulleys might be used instead of the spur and pinion wheels that I have shown in the drawing.

The traverse-bar M, which I would define as a sliding bar or rod, whose function is to transmit the motion of the stitching and the pattern mechanism to the needle-bars, (its form is changed, of course, with every variation of the stitch or pattern mechanisms, as is seen in comparing Fig. 3 with Fig. 20,) is, as I consider, a valuable novelty in lappet-looms.

In lappet-looms heretofore, as far as I can learn, the whip or embroidery yarn has been delivered to the needles from a beam, or spools, or bobbins, while the tension has been regulated by friction applied to the beam or spools, or to the yarn itself by sliding plates, or otherwise, merely to retain or hold back the yarn; but it has never been found possible to obtain, by such means a uniform delivery. The consequence has been that the stitch has never been uniform or regular.

I have obtained this result by passing the whip-yarn between the friction-rollers F. The yarn is put on a beam, or on spools, or bobbins, as before. A wire-faller or some equivalent arrangement is placed so as to take up the slack and keep the yarn straight. It then passes between the rollers F, and thence to the needles. The rollers may be covered, if necessary, with some material sufficiently adhesive to hold the yarn from slipping. The rollers F are moved laterally by the upright arms *r r* on the traverse-bar, so that the yarn is always directly under the needles. The lower roller F slides on a square shaft, which revolves in bearings fixed to the sword, so that the traverse-bar moves the rollers with the needles, always presenting the yarn in a straight line to the needles. The upper roller is a friction-roller, moved by the lower one. To the end of the square shaft is fixed a combined pinion and ratchet-wheel, G, having spur and ratchet teeth side by side. The spur-teeth play into the rack H as the lay comes up to the breast-beam. The spur-teeth in the rack turn the pinion-wheel and cause the rollers F to take back the whip-yarn that has been given out. When the pinion gets to the end of the spur-teeth in the rack it does not revolve further, but, having a friction sufficiently strong for the purpose, it slides on the rack as well as on the ratchet-teeth, and, of course, takes up no more of the yarn. The yarn thus left is what is required for the stitch; and as soon as the stitch is formed and the slack yarn used up the lay starts to go out. At this point the ratchet part of the wheel N catches into the ratchet-teeth of the rack, and it begins at once to revolve and give out yarn from the rollers. The ratchet-teeth cause the pinion to revolve until it catches into the spur-teeth, and they continue the revolution until the end of the stroke, when the needles are full up. By this means a certain definite quantity of yarn is furnished to the needles without tension or irregularity, and the stitch is always uniform; but it is necessary that the quantity of whip-yarn thus furnished to the needles should be susceptible of variation and adjustment. I accomplish this by the use of the double wedge-bar I I working vertically in the rack H, drawing it out or pushing it in as the double wedge moves up and down. When the bar rises the inclination of the wedge draws the rack toward the breast-beam and gives the spur-teeth more action, and, of course, causes the rollers to take up more yarn, leaving less for the stitch. Reversing the motion gives out more yarn for the stitch. This wedge-bar is held in an upright position by bearings attached to the loom side, and the lower end rests upon the lever *n*. This lower end of I is adjusted with a screw, so that the length of yarn for the stitch can be regulated without reference to the lever *n*.

The vertical motion is given by the pin in stitch-bar O, raising the lever *n*, which, in turn, raises I. (See Fig. 4.)

The lever *n* may be adjusted by a stop-motion, which would hold the lever just out of the range of the pin in the stitch-bar O, so that, in ordinary stitching, it need not be moved, except when a stitch longer than usual is wanted.

A modification of the above plan is to place the whip-yarn on one roller instead of passing it between two, giving a turn completely around the roller, which may, if necessary, be covered with sand-paper or other rough substance to give sufficient adhesion to the yarn. Another plan is to place the roller or rollers near the whip-yarn beam, having the faller between it and the needles. Another, still, is to place the whip-yarn beam so that it should rest on a drum properly geared to give out the right quantity.

I think the plan first described to be more precise in its action and more closely adjustable than any others.

In making the circular borders for gored skirts or dresses it is necessary sometimes to make so large a circle as to require more traverse than can easily be given to the needles by the above arrangement. When this is the case I propose to weave the border separately from the garment and attach it afterward. To do this I put the warp of the cloth upon the conical spools *o*, which are placed upon one shaft, and are put in the place of the usual warp-beam. The cloth woven by this arrangement is taken up by a cloth-beam, *p*, or upon cloth-rollers shaped to match the arrangement of the spools *o*. The lappet-work is thrown into the center of these strips, which, when cut apart, will form circles of a radius proportioned to the difference in the diameters of the different ends of the conical spools.

If, in the employment of the conical spools, it should be necessary to make the degree of taper adjustable, it can be done by cutting a screw on the shaft, to which a conical nut may be fitted.

The spools or rollers may be made in longitudinal strips, like the staves of a barrel; then fastened together at one end and expanding or contracting at the other end by the conical nut.

Fig. 21 of the drawing shows the operation of the device.

Every weaver understands how great is the disadvantage of placing the reed out of its natural position; and it will be readily understood why it has been very difficult to make good cloth upon a lappet-loom.

In order to give steadiness to the pin-bar I attach a thin strip of metal or other suitable substance close to the edge of the race-board, leaving just space enough to allow the pins to pass easily between the edge of the race-board and the guide-strip. The position and use of this guide-strip are shown by letter *m*, Fig. 9, of the drawing. Another plan to accomplish the same result is to bore holes in the edge of the race-board and set it back far enough to allow the pins to pass up through the holes, or to attach little eyes or brackets to the edge of the race-board to guide the pins.

The needle-bar or bars are attached to the pin-bar by slots and studs, and thereby receive their vertical motion, as will be seen by reference to the drawing.

In raising the pin-bar it is necessary, in order to give the needles time to shift their position in making the stitch, that the pin-bar should not start up until the lay has made one-fourth, or thereabout, of a stroke.

To obtain the irregular motion necessary for this result, I make the lifting-roller *j* of irregular shape instead of round. The same result would follow from making the rollers *i i* of the same shape instead of *j*. This shape must raise the pin-bar rapidly at first and dwell when the pins are up.

In the foregoing description I have described a loom containing only one needle-bar; but it is evident that the bar and its operating mechanism can be duplicated, or can be used with the old or any known form of lappet mechanism.

What I claim as my invention, and desire to secure by Letters Patent, is—

1. The combination of the pattern mechanism with the stitching mechanism, when the two are actuated by different powers, or are connected with the same power by intermediate gearing or attachment, so as to give to each mechanism a motion distinct from the other, and so that the speed of each may be adjusted independently of the other, substantially as described.

2. The combination of the stitching mechanism with the pattern mechanism, when the stitching mechanism is fixed on bearings independent of the lay, but is operated on the same axis as the lay itself, substantially as described.

3. The combination of the driving or stitch-wheel U with the spur-wheel Y, pinion Z, pattern-wheel *b*, substantially as described.

4. The lever *e* with adjustable fulcrum, in combination with the traverse-bar M and needle-bar for regulating its movements, substantially as described.

5. The friction-sleeve having an upright stand, in combination with the pattern and stitch wheels and traverse-lever *e*, substantially as described.

6. The combination, with the stitching mechanism, of the adjustable pawl Q, constructed and operating substantially as described.

7. The stitching mechanism provided with removable cams, swells, or sliding projections, one or more, when combined with a pattern mechanism operating independently of the stitching mechanism.

8. The combination of the removable pattern-rim *c* and the pattern-wheel *b* and the stitching mechanism, arranged and operating substantially as described.

9. The combination of the independently-acting stitching and pattern mechanisms with the traverse-bar M, substantially as described.

10. The combined pinion and friction-wheel N in combination with the friction-wire, substantially as described, and for the purpose set forth.

11. The friction rollers or cylinders, one or more, for the purpose of giving a definite, yet adjustable quantity of whip-yarn in a direct line to the needles, substantially as described.

12. The combined ratchet and pinion wheel G, in combination with the rack H, substantially as and for the purpose set forth.

13. The double wedge-bar I, for the purpose of regulating the quantity of whip-yarn to be furnished to the needles, substantially as described.

14. The lever *n*, in combination with the bar O and its pin for raising the double wedge-bar, substantially as described.

15. The combination of the mechanism which makes the stitch with the mechanism which gives the whip-yarn to the needles, arranged and connected substantially as described, so that the motion of the mechanism which gives off the whip-yarn to the needles may be regulated and controlled by the stitching mechanism sliding or traversing the let-off roller or rollers, so as to bring the whip-yarn at all times in a line with the needles.

16. The conical spools *o* combined with the stitching and pattern mechanisms and needle-bars, substantially as described.

17. The roller *j* of irregular or cam-shape, in combination with the pin and needle bars, for the purpose of giving them an irregular motion, substantially as described.

F. W. NEWTON.

Witnesses:
A. B. MALCOLMSON, JR.,
JAMES H. HUNTER.